United States Patent [19]

Braun

[11] Patent Number: 4,747,326

[45] Date of Patent: May 31, 1988

[54] SPEED CONTROL SYSTEM

[75] Inventor: Eugene R. Braun, Royal Oak, Mich.

[73] Assignee: Eaton Corporation, Cleveland, Ohio

[21] Appl. No.: 850,639

[22] Filed: Apr. 11, 1986

[51] Int. Cl.[4] .............................................. B60K 41/06
[52] U.S. Cl. ........................................ 74/866; 74/859
[58] Field of Search ................. 74/866, 843, 855, 335, 74/856, 864, 860, 859; 364/424.1; 180/170, 176, 179

[56] References Cited

U.S. PATENT DOCUMENTS

| | | | |
|---|---|---|---|
| 3,776,048 | 12/1973 | Enomoto et al. | 74/866 |
| 3,898,894 | 8/1975 | Aono et al. | 74/866 |
| 4,038,889 | 8/1977 | Lindow et al. | 74/866 |
| 4,286,685 | 9/1981 | Rudolph et al. | 180/176 |
| 4,463,427 | 7/1984 | Bonnetain et al. | 74/866 |
| 4,463,822 | 8/1984 | Tanigawa et al. | 74/866 |
| 4,499,542 | 2/1985 | Hamajima et al. | 74/866 X |
| 4,506,752 | 3/1985 | Hara et al. | 74/866 X |
| 4,535,864 | 8/1985 | Tanigawa et al. | 74/866 X |
| 4,560,024 | 12/1985 | Noda et al. | 74/866 X |

Primary Examiner—Leslie A. Braun
Assistant Examiner—David Novais
Attorney, Agent, or Firm—D. A. Rowe; A. E. Chrow

[57] ABSTRACT

An improved vehicular speed control system is provided that includes a logic member (2) operative to receive and process a gear ratio position signal (14) and either a vehicle speed signal (6) or an engine speed signal (7) and provide an output control signal (21) to an actuator (22) operative to control the engine throttle (24) or the like to maintain engine speed only when certain predetermined optimum gear ratios are engaged by an operator of the vehicle.

10 Claims, 1 Drawing Sheet

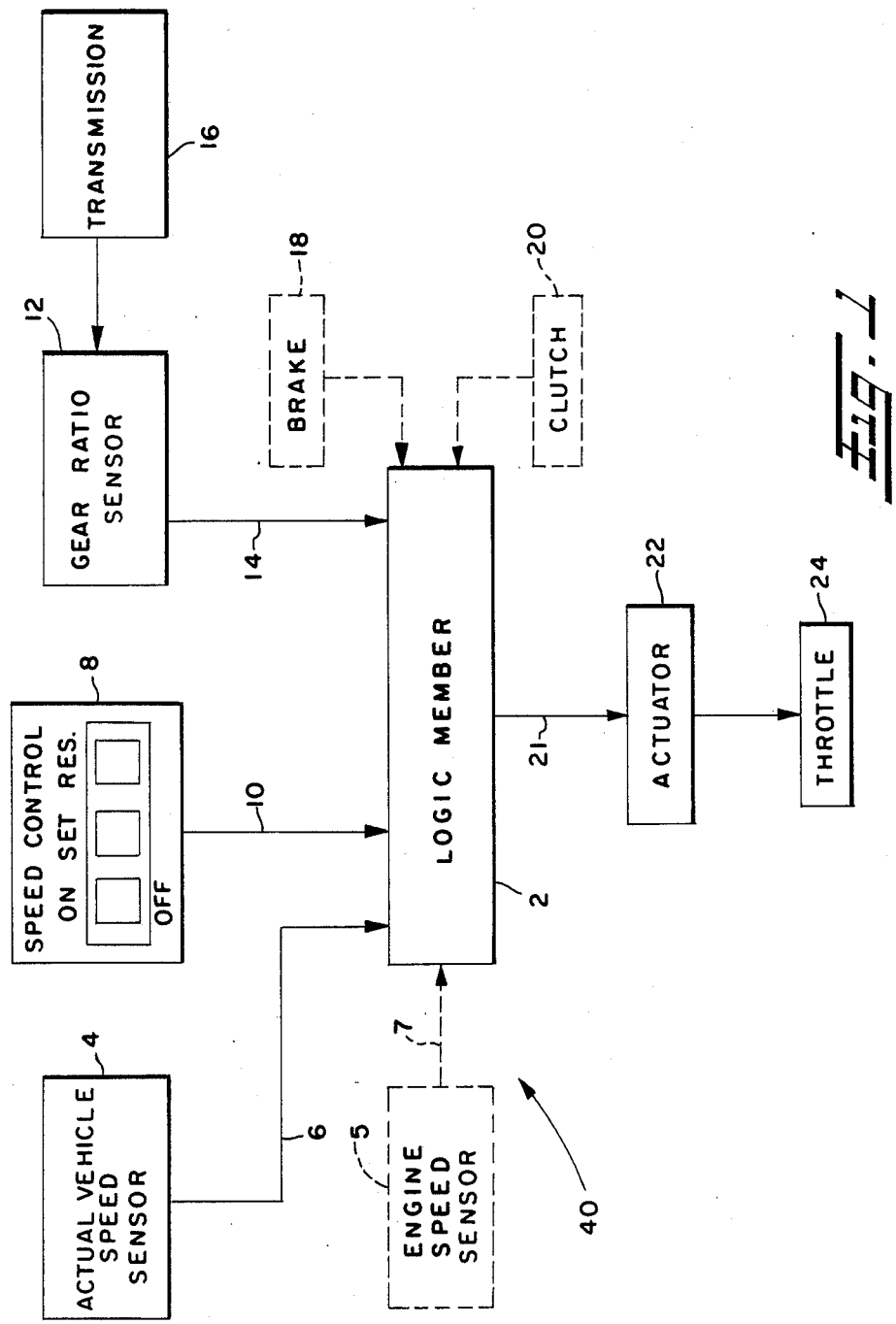

SPEED CONTROL SYSTEM

INTRODUCTION

This invention relates generally to a vehicular speed control system and more particularly to an improved vehicular speed control system that is prevented from controlling vehicle and/or engine speed about a selected value whenever the gear ratio of the vehicular transmission is not that predetermined as optimal for the vehicle speed at which control is desired.

BACKGROUND OF THE INVENTION

Various kinds of speed control systems, commonly called "cruise" control systems, have been employed in the past for automatically maintaining a desired vehicle speed. Such control systems characteristically include some type of vehicle or engine speed sensor that monitors actual vehicle or engine speed which the control system then compares to the vehicle speed at which automatic control is desired which is commonly manually pre-set into the control system to provide an error signal to an actuator connected to the vehicle throttle or other means operative to control engine speed. Accordingly, the error signal progressively diminishes as the actual vehicle or engine speed approaches the desired vehicle or engine speed enabling the actuator to substantially maintain the vehicle or engine speed at the desired condition.

An example of one type of speed control system for trucks that employs a vehicle or engine speed sensor and is operative to compare such speed with a desired vehicle or engine speed to provide an error signal operative to control air pressure delivered to an air actuated throttle is disclosed in U.S. Pat. No. 4,286,685, the disclosure of which is incorporated herein by reference and which further discloses the well known practice by which means are included for automatically disengaging the speed control whenever the brake and/or clutch are employed In addition to speed control systems, various systems have heretofore been employed to optimize engagement of vehicular transmission gear shift ratios for particular vehicle or engine speeds such as disclosed in U.S. Pat. Nos. 3,776,048 and 4,038,889, the disclosure of both of which are incorporated herein by reference.

Vehicular transmissions are generally provided with a plurality of forward gear ratios predetermined as optimal for use within prescribed speed ranges. The efficient operation of trucks, particularly heavy duty trucks, is highly sensitive to the particular gear ratio being used in relation to the speed and load being carried.

Although the prior art is replete with systems for controlling selection of vehicular transmission gear ratios in relation to engine speed and automatically controlling vehicle or engine speed at a desired condition, no one heretofore had thought to make transmission gear ratios a parameter in determining whether an operator would be able to enjoy the convenience and fuel economy of using automatic speed control.

Since automatic speed control is a convenience to the operator, a need has existed to improve efficient operation of vehicles, particularly trucks and more particularly heavy duty trucks, to provide a means of preventing the operator from engaging the speed or cruise control system in the event the transmission gear ratio is not that predetermined as optimum for the vehicular speed at which automatic control is desired

SUMMARY OF THE INVENTION

Accordingly, it is an object of this invention to provide an improved vehicular automatic speed control system.

It is another object of this invention to provide an improved vehicular speed control system whose control operation is dependent upon the particular vehicular transmission gear ratio being employed at the vehicular and/or engine speed at which automatic control is desired.

It is a further object of this invention to provide an improved automatic vehicular speed control system that is rendered inoperative whenever the vehicular transmission gear ratio in use at the time is not that predetermined as optimum at the speed at which automatic control is desired.

It is also a further object of this invention to provide an improved vehicular speed control which is rendered inoperative when the driver selects a vehicle control speed above a predetermined maximum vehicle speed.

BRIEF DESCRIPTION OF THE DRAWING

FIG. 1 shows a block diagram of an embodiment of the improved speed control system of the invention.

DESCRIPTION OF A PREFERRED EMBODIMENT

In FIG. 1, improved speed control system 40 of the invention comprises logic member 2 operable to receive and operate upon information concerning actual vehicle ground speed such as provided by signal 6 from sensor member 4. Alternatively, engine speed such as provided by signal 7 from engine speed sensor member 5 may be used in place of vehicle ground speed since the two are related and as such, the term "vehicular speed" as used herein means either engine speed or vehicle ground speed. Member 2 also receives information relating to the vehicular speed at which automatic control is desired provided by signal 10 from speed control means 8 such as by accelerating the engine speed to provide a vehicular speed desired and then engaging the "set" button in speed control 8. Member 2 also receives information concerning the gear ratio of transmission 16 being employed at the time by means of signal 14 provided by gear ratio sensor 12.

Preferably system 40 includes a brake switch or sensor 18 for rendering control 40 inoperative by placing speed control 8 in an "off" condition whenever the brake is engaged. System 40 also preferably includes a clutch switch or sensor member 20 for transmissions that require a clutch that is operative to render control system 40 inoperative whenever the clutch is actuated When system 40 is operative to control the vehicle speed, member 2 operates upon the information received and provides a control signal 21 to actuator 22 which may be any device that is operative to control vehicular speed such as by adjusting throttle 24 or other device operable to maintain vehicular speed at the desired condition selected. The desired vehicular speed selected is established by engaging the "set" button of speed control 8 when the speed is that desired. However, system 40 is operative only as long as the gear ratio determined by sensor 12 is that predetermined as optimum for the speed at which automatic control is desired.

In the event the gear ratio sensed by sensor 12 is not that assigned as optimal for the speed condition at which automatic control is desired, such information is operated upon by member 2 to provide a signal to actuator 22 preventing control system 40 from controlling vehicular speed until the gear ratio matches that predetermined as optimum for the particular vehicular speed at which it is desired to control.

The principle of whether control system 40 is operative to substantially maintain vehicular speed at a desired condition as a function of whether or not the transmission gear ratio in use at the time is that predetermined as optimum for the controlled speed desired also pertains to automatic speed control systems that include the resume function indicated as "res" for speed control 8 in FIG. 1. Actuation of "res" causes control system 40 to seek out the desired vehicular speed condition previously established. By including the optimum gear ratio requirement at the speed at which automatic control is desired, control system 40 is prevented from providing automatic control whenever the gear ratio engaged at the speed at which the "res" button is engaged does not correspond to the gear ratio predetermined as optimum for the vehicular speed at which automatic control is desired.

An additional feature may be provided in the control system 40 by logic member 2 having a predetermined stored maximum vehicle speed which may be established by engaging the "set" button of speed control 8. Alternatively, logic member 2 may prevent control system 40 from controlling vehicle speed until the desired vehicle speed established by engaging the "set" button of speed control 8 is less than the predetermined stored maximum vehicle speed.

The improved control system of the invention may be either or both fluid operated or electrical in design by means well known to those skilled in the art of speed control systems.

Although particularly advantageous for use with vehicles having manual transmissions, the improved speed control system of the invention may also be used with vehicles having automatic transmissions as well as with vehicles having a transmission selectively operable in either manual or automatic modes.

What is claimed is:

1. An improved vehicular speed control system for use with vehicular transmissions having a plurality of forward gear ratios that are respectively predetermined as optimum for use at predetermined vehicular speeds, said control system comprising:

vehicular speed sensing means operative to provide a signal indicative of actual vehicular speed, speed selector means operative to provide a control signal indicative of a particular vehicle speed selected to be maintained, gear ratio sensor means operative to provide a signal indicative of the transmission gear ratio in use, actuator means operative to maintain the selected vehicular speed upon receipt of the control signal, and logic means operative to receive and process said actual vehicular speed signal, said control signal, and said gear ratio sensor signal and provide said control signal to said actuator means only when the gear ratio is that predetermined as optimum for the particular vehicular speed selected to be maintained.

2. The control system of claim 1 wherein the transmission is an automatic transmission.

3. The control system of claim 1 wherein the transmission is a manual transmission.

4. The control system of claim 1 wherein the transmission is operable in manual and/or automatic modes.

5. The control system of claim 1 including means enabling an operator to render the control system inoperable.

6. The control system of claim 1 wherein the transmission includes a manually operated clutch member operable to render the control system inoperable upon actuation by an operator.

7. The control system of claim 1 wherein the vehicle includes a manually operated brake member operable for braking the vehicle and for rendering the control system inoperable upon actuation by an operator.

8. The control system of claim 1 wherein the control system includes means to record vehicular speeds in excess of a predetermined maximum.

9. The control system of claim 1 wherein the control signal is indicative of a particular vehicular speed selected to be maintained which is below a predetermined maximum.

10. The control system of claim 1 wherein said actuator means maintains a predetermined maximum vehicle speed when the speed selector means provides a control signal which is greater than said predetermined maximum vehicle speed.

* * * * *